US008990414B2

(12) United States Patent
Noldus et al.

(10) Patent No.: US 8,990,414 B2
(45) Date of Patent: Mar. 24, 2015

(54) METHOD AND APPARATUSES FOR MAKING USE OF VIRTUAL IMS SUBSCRIPTIONS COUPLED WITH THE IDENTITY OF A NON SIP COMPLIANT TERMINAL FOR NON-REGISTERED SUBSCRIBERS

(71) Applicant: Telefonaktiebolaget L M Ericsson (Publ), Stockholm (SE)

(72) Inventors: Rogier Noldus, Goirle (NL); Ralf Keller, Würselen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 227 days.

(21) Appl. No.: 13/751,437

(22) Filed: Jan. 28, 2013

(65) Prior Publication Data

US 2013/0132597 A1 May 23, 2013
US 2014/0372618 A9 Dec. 18, 2014

Related U.S. Application Data

(62) Division of application No. 12/520,053, filed as application No. PCT/EP2006/069918 on Dec. 19, 2006, now Pat. No. 8,392,582.

(51) Int. Cl.
*G06F 15/16* (2006.01)
*H04L 29/06* (2006.01)
(Continued)

(52) U.S. Cl.
CPC ...... *H04L 65/1066* (2013.01); *H04L 29/12094* (2013.01); *H04L 61/1529* (2013.01); *H04L 67/16* (2013.01); *H04L 65/1016* (2013.01)
USPC .......................................... 709/228; 709/227

(58) Field of Classification Search
CPC .................. H04L 29/06027; H04L 65/1016; H04L 65/1069; H04L 65/1009; H04L 65/1006; H04L 29/06; H04L 12/1818; H04L 65/103; H04L 65/104; H04L 65/1043; H04L 65/4007; H04L 65/403; H04L 12/1827
USPC ................... 709/203, 217–219, 223–229, 250
See application file for complete search history.

(56) References Cited

U.S. PATENT DOCUMENTS 6,115,372 A 9/2000 Dinha
7,353,405 B2 4/2008 Chevalier et al.
(Continued)

FOREIGN PATENT DOCUMENTS

JP H07-322349 A1 12/1995
WO WO 2004/075580 A1 9/2004

OTHER PUBLICATIONS

Digital Cellular Telecommunications Systems (Phase =2); Universal Mobile Communications Systems (UMTS); IP Multimedia Subsystem (IMS); Stage 1) (3GPP TS 23.288 v7.6.0) Release 7, ETSI Standards, European Telecommunications Standards Institute. vol. 3-SA2, No. v760. Dec. 11, 2006.

*Primary Examiner* — Zarni Maung (57) ABSTRACT

A Service Interaction Manager in a Packet Based Multimedia System (PBMS) for initiating a session with a terminal utilizing a temporary virtual subscription when the terminal does not have a subscription with the PBMS. A table stores temporary virtual subscriptions. A Coupling Function connected with a Network Access Gateway and the table utilizes the table to select an available virtual subscription and to store in the table, a temporary association between an identifier of the terminal and the available virtual subscription. A Correlation Function connected with a requested service, the table, and a PBMS access gateway receives from the PBMS access gateway, a session start request message with the terminal identifier, and utilizes the table to correlate the session start request message with the available virtual subscription based on the terminal identifier.

9 Claims, 7 Drawing Sheets

Overview according to the invention.

(51) Int. Cl.
  *H04L 29/12* (2006.01)
  *H04L 29/08* (2006.01)
  *G06F 12/00* (2006.01)

(56) References Cited

U.S. PATENT DOCUMENTS 8,392,582 B2 * 3/2013 Noldus et al. ............ 709/227
2002/0191572 A1 * 12/2002 Weinstein et al. ........... 370/338
2003/0046400 A1 * 3/2003 Friel et al. .................... 709/228
2003/0214958 A1 * 11/2003 Madour et al. ............... 370/401
2004/0266440 A1 * 12/2004 Fuchs et al. .................. 455/445
2005/0249196 A1 * 11/2005 Ansari et al. ................. 370/352
2007/0168420 A1   7/2007 Morris
2008/0141355 A1   6/2008 Chevalier et al.
2008/0240088 A1  10/2008 Nakata

* cited by examiner

Figure 1, Prior art schematic drawing.

Figure 2, Prior art general overview.

Figure 3, Overview according to the invention.

Figure 4, Message flow according to the invention.

Figure 5, Overview of the first embodiment.

Figure 6, GAN alternative of the first embodiment

Figure 7, Message flow of the first embodiment.

Figure 8, overview of the second embodiment.

Figure 9, Message flow of the second embodiment.

Figure 10, overview of the third embodiment.

Figure 11, Message flow of the third embodiment.

Figure 12, Overview of the fourth embodiment.

Figure 13, Message flow of the fourth embodiment

METHOD AND APPARATUSES FOR MAKING USE OF VIRTUAL IMS SUBSCRIPTIONS COUPLED WITH THE IDENTITY OF A NON SIP COMPLIANT TERMINAL FOR NON-REGISTERED SUBSCRIBERS

RELATED APPLICATIONS

This application is a divisional of co-pending U.S. patent application Ser. No. 12/520,053 filed Jun. 18, 2009, which is a 371 of International Application No. PCT/EP2006/069918, filed Dec. 19, 2006, the disclosures of which are fully incorporated herein by reference.

TECHNICAL FIELD OF THE INVENTION

The present invention relates to providing users, having circuit-switched user equipment, connected to a $2^{nd}$ or $3^{rd}$ generation telecommunication network, access to advanced services in $3^{rd}$ generation packet-switched networks.

BACKGROUND

Third Generation, 3G, Networks such as Universal Telecommunication Network, UMTS, and CDMA 2000 provide high-speed wireless Internet access to mobile users over a wide coverage area. For the 3G networks the IP Multimedia Subsystem (IMS) has been defined to provide cellular access to telephony and multimedia services. The IMS uses packet-based technology, in particular IP, Internet Protocol, and other IETF, the Internet Engineering Task Force, protocols for offering services. The strength of IMS is offering of enhanced services, for example multimedia services combining voice and data. Further, the usage of IP-network as a single underlying standard allows an easy and fast service deployment.

Second Generation, 2G, networks, like Global System for Mobile communications, GSM, and $3^{rd}$ generation networks, like UMTS, provide voice based services on a circuit-switched technology.

Currently the majority of terminals do not support IMS technology with SIP, Session Initiation Protocol, as defined in IETF-RFC 3261 as signalling protocol, as these terminals are baaed on circuit switched voice. Operators however want to give these 2G and 3G terminals access to their advanced IMS services.

In current art cooperation between 2G or 3G with an IMS is known as overlay system which allows 2G or 3G non SIP supporting terminals, calling, being called or during a call, mid-call, to make use of IMS based services.

The following sections describe simplified network architecture of IMS. In particular the nodes being involved in prevision of service to non SIP supporting terminals in IMS architecture are mentioned as well as the involved parts of the 2G or 3G network.

The components of the IMS system are CSCF, Call Session Control function the MGW/MGCF, Media Gateway/Media Gateway Control Function, the HSR, Home Subscriber Register, the AS, Application Server, the AP, IMS service application, and the SIM, Service Interaction Manager.

The applicable components in the mobile circuit switched Network are the MSC, Mobile Service switching Centre, HLR, Home Location Register, VLR, Visitor Location Register, and RAN, Radio Access Network.

The CSCF acts as a call server and handles call signalling, it supports and controls the multimedia sessions and performs address translation functions. The CSCF can be functionally decomposed to S-CSCF, I-CSCF and P-CSCF.

The P-CSCF, proxy-CSCF, is the first contact point in a visited IMS network and it provides authorization of bearer resources, further it forwards a SIP register request received from the UE, User Equipment, to an I-CSCF determined using the home domain name, as provided by the UE. In The opposite direction it forwards the SIP request or response to the UE. Moreover the CSCF forwards SIP messages received from the UE to an S-CSCF whose name the P-CSCF has received as a result of the registration procedure.

The I-CSCF, Interrogating-CSCF, is the contact point within an operator's network for all connections destined to a subscriber of that network operator. There may be multiple I-CSCFs within an operator's network. A function performed by the I-CSCF is assigning an S-CSCF to a user performing SIP registration.

The S-CSCF, Serving-CSCF, is the node that performs the session management for the IMS network. There can be several S-CSCFs in the network. The main functions of S-CSCF include: IMS session handling, acceptation of registration requests from OS, and interaction with an optional SIM for the support of services. Further it provides endpoints for specific services, like for example notification of tones/announcement, allocation of additional media resources, billing notification.

The HSR, Home Subscriber Register, in the centralized subscriber database. The HSR interfaces with the I-CSCF and the S-CSCF to provide information about the location of the subscriber and the subscriber's subscription information. The HSR is responsible for holding the following user related Information: user identification, numbering and addressing information, user security information for authentication and authorization. The HSR supports the user registration, and stores inter-system location information.

The MGCF, Media Gateway Control Function, performs the inter-working between IMS and legacy circuit switched networks, like GSM. An IMS network may contain several MGCF nodes. The actual media, e.g. voice, is passed through an MGW, Media Gateway. One MGCF controls one or more MCWs.

The MGCF performs protocol conversion between cellular call control protocols and IMS protocols. For example, the MGCF receives a SIP message from the CSCF and converts this message into appropriate ISUP, ISDN user Part, message and sends this ISUP message to the MSC. Thus, the primary function of MGCF is to convert signalling information from one format to another. This will predominantly be between ISUP, commonly used in circuit switched networks and SIP as used in IMS.

Like the MGCP for signalling, the MGW can provide comparable conversion for the media. This will predominantly be between PCM, Pulse Code Modulation, commonly uses in circuit switched networks and an IP based format like uses in the IMS. The MGW may also provide additional facilities for the IMS like secured tunnelling or firewall.

The actual IMS services are provided by AP, IMS service applications, running on the AS, Application Server. The AS is connected to the S-CSCFs in the IMS network through a SIM, Service Interaction Manager. The SIM takes care of chaining multiple services as well as solving inconsistencies when invoking multiple services. Additionally the SIM may take care that required information is extracted only once from registers like the HSR and passed to multiple services.

Terminals in the IMS network can establish voice calls using SIP as the signalling protocol. The SIP messages are sent to communicate one request to the CSCF, Call Session Control Function, in the IMS. In this case, the media, is transmitted as packets throughout the network.

3G users have a subscription that is contained in the HSR. In order to access any service in IMS the user has to perform a registration procedure for his terminal in the IMS network. Said registration procedure is performed by means of a user agent implemented in the user's terminal.

Registrations in the IMS network have only a limited live time. They nave to be constantly renewed, in practice every 24 to 48 hours. The user agent takes care of the renewal.

Terminals not being SIP compliant lack the user agent and need therefore an alternative way of subscription and registration in the IMS network. The alternative way is described with a GSM terminal as example.

Before the GSM terminal can be registered in the IMS network it requires that it is has a subscription in IMS. This subscription can either be fixed or dynamic. In the case of a fixed subscription, the GSM terminal has a subscription comparable to SIP compliant terminals in the HSR which contains user and terminal details. In the case of a dynamic subscription a subscription is prepared in the HSR but the user/terminal details are dynamically entered in the registration procedure of the terminal.

A GSM subscriber has a subscription contained in a SLR. When a terminal a t the GSM subscriber is switched on in a GSM network, the GSM terminal is registered it a VLR of that GSM network. The HLR holds the identity of the VLR/MSC where the subscriber is registered.

The HLR also holds for the GSM terminal which services are available in the IMS network by means of an 'IMS service indicator'. The IMS service indicator is an indication that for a specific GSM terminal, specific services should be obtained from the IMS. This IMS service indicator may be an Intelligent Network, IN, service subscription element like an Originating CAMEL Subscription Information, O-CSI.

In this case signalling of a calling GSM terminal must be routed from the MSC to she MGCF, and subsequently to an S-CSCF in the IMS network to be able to invoke IMS services. Likewise, when being called, the signalling related to the terminating call must be routed from the GMSC to the MGCF, and subsequently to an S-CSCF.

As the GSM terminal is mobile it moves from one MSC to another which can be over network boundaries. The HLR has a specific mechanism of location update messaging to which functions can subscribe, who will then receive updates of change of location of the GSM terminal, hereto the HLR instructs the VLR to send a notification to such functions when the user performs a location update. A comparable mechanism in VLR and HLR is present for switching the GSM terminal on or off.

The IMS network is in principle designed to deploy IMS services to registered terminals. The ESP holds all IMS registrations.

When a GSM terminal performs a dynamic registration in the IMS network, it is registered only for the period it is switched on, also known as "surrogate" registration.

In line with one of the basic IMS principles, Surrogate registrations in the IMS network have only a limited life time. They have to be constantly renewed, in practice every 24 to 48 hours, as long as the GSM terminal is switched on. A surrogate registration function in the IMS network takes care of the renewal of the surrogate registration.

The current art solution to register non SIP compliant terminals (not having the agent function) in the 3G as IMS users is based on a surrogate registration. This solution has however some drawbacks;

In practise every switched on non SIP compliant terminal remains registered in the IMS network for the event that it might invoke an IMS service. This gives an additional load on the IMS core network as well as the space required in the S-CSCF/HSR to store all surrogate registrations. The high number of registrations stored in the S-CSCF/HSR has also impact on the performance of the IMS network. The load on the IMS network is also high as it needs to perform the actions for registering non SIP compliant terminals, as well as act on expiring of the registration, and deregister when switched off.

Another problem in the current art is the loss of information like original called party number. International Mobile Subscriber Identity, IMSI, and location information. Due to incompatibility between ISUP and the SIP mechanism International Mobile Subscriber Identity and location information can not be included in the SIP Invite message for invoking a service in the IMS. In addition signalling constraints in ISUP may have the effect that the original called party number can be transported to the IMS network only partly.

SUMMARY AND DESCRIPTION OF THE INVENTION

Therefore, it is an object of the present invention to provide improved performance when providing packet-based services to terminals not having a subscription in the packet based multimedia system.

The invention is disclosed in the independent claims. Advantageous embodiments are described in the dependent claims being disclosed in the corresponding parts of the description.

The present invention solves the above stated drawbacks with the introduction of virtual subscribers in the IMS, which are temporarily coupled to terminals not having a subscription in the IMS, starting a call, being called or during a call for the purpose of initiating a SIP session and are released after the SIP session is initiated.

The advantage of the present invention is that the registration procedures for terminals not caving a subscription in the packed based multi-media system are no longer required. Only when calling, when being called, or when initiating service invocation during a call, a free virtual IMS subscription is temporarily coupled to an identity of the terminal not having a subscription for the purpose of initiating a SIP session. After initiation of the service, the virtual IMS subscription is released and can be used for coupling to another identity of another terminal not having a subscription in the IMS. Therefore the IMS network is released from activities regarding registration and deregistration of temporary IMS subscriptions, the continuous location update for them and the renewal procedures. The number of virtual IMS subscriptions can be quite low; it may be equal to the maximum number of incoming and outgoing calls for terminals not having a subscription in the IMS, which are in the establishment phase. Therefore the load of HSR and S-CSCF is significantly lower.

A further advantage is that the temporary coupling method also provides the means to pass terminal specific parameters directly to an IMS application via the SIM.

Further advantageous embodiments are described in the dependent claims.

DETAILED DESCRIPTION

In the following sections, preferred examples of the present invention are described in detail, in order to provide the skilled person with thorough and complete understanding of the invention, but these detailed embodiments only serve as examples of the invention and are not intended to be limiting. The following description shall make reference to the enclosed drawings, in which FIG. 1 shows a schematic representation of a current art overlay system between GSM and IMG network.

It should be noted that the term "terminal" in the context of the present invention refers to any apparatus connected in network suitable for interaction between a user of the network and the network. A terminal having SIP capabilities or being SIP compliant is described as "SIP terminal". The general term "terminal" designates all other terminals not having these capabilities or compliancy.

The entities in the description of the invention and the embodiments of the invention are described by their characteristics and functions, logical entity, rather than an explicit combination of hardware and software, physical entity. It shall be noted that several logical entities can be combined in one physical entity, one logical entity implemented in one physical entity or one logical entity can be divided over several physical entities.

In the description the term Session focuses on the initial set up of a session between a terminal and an IMS service. Initially the end-points of the sessions are terminal and service. A path connects these end-points. Both end-points and path may however change under control of the service rendered. Some examples for illustration:

The service acts as information broker and takes care of communication to information storages; the service constitutes the end-point, The service migrates the service end-point to another function inside or outside the PBMS, Packet Based Multi Media System, The service migrates the service end-point to another terminal, The service migrates the terminal end-point to an announcement like a busy statement when called.

It might also be clear that the path between end-points can be migrated outside the scope of the Packet Eased Multi Media System like a session to another terminal not having a subscription in the PBMS. For that reason and for the reason that the invention relates to setting op the initial session, the description will not give further details on how services can migrate path and end-points.

Figure 1:
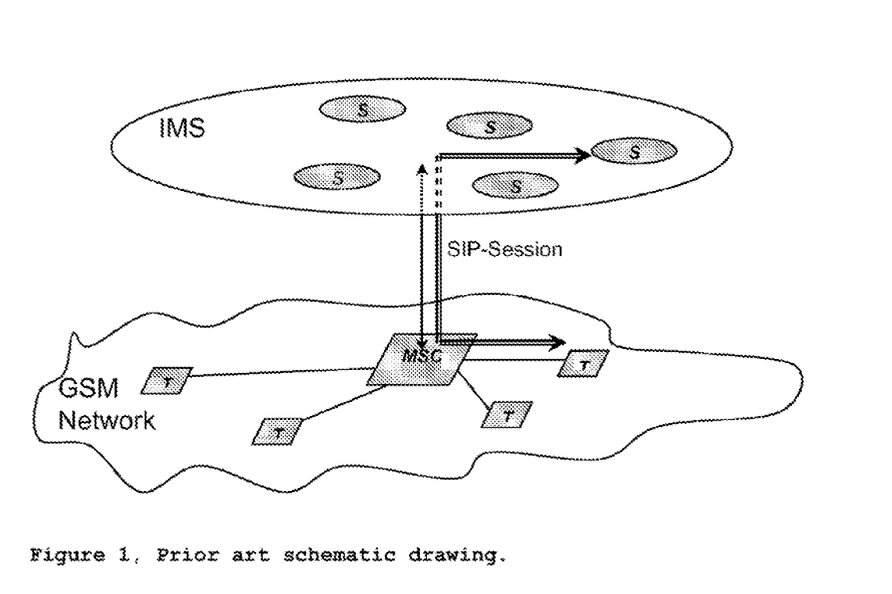
Figure 2:
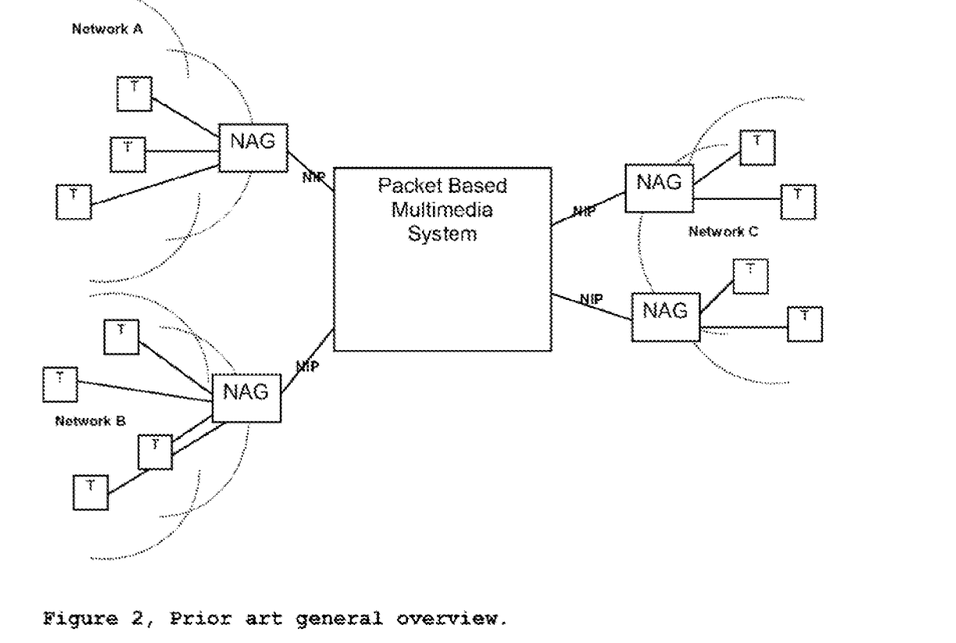
FIG. 2 shows a schematic representation of a current art overlay system between a network and a packet based multimedia system.

Referring to FIG. 2 the Packet Based Multi Media System according to the invention is connected to at least one network not supporting SIP. See for the full definition of the SIP standard IETF-RFC 3261. The Packet Based Multi Media System is connected through at least one Network Access Gateway (NAC) to the network. The Packet Based Multi Media System communicates with the Network using a Network Interface Protocol (NIP) like ISUP. Inside the network, terminals (T) are directly or indirectly connected to the Network Access Gateway (NAG) based on a Network Internal Protocol.

As the Packet Based Multi Media System can have connections to multiple networks having different Network Interface Protocols (NIP), the Packet Based Malta Media System has the capabilities to handle different Network Interface Protocols simultaneously.

Figure 3:
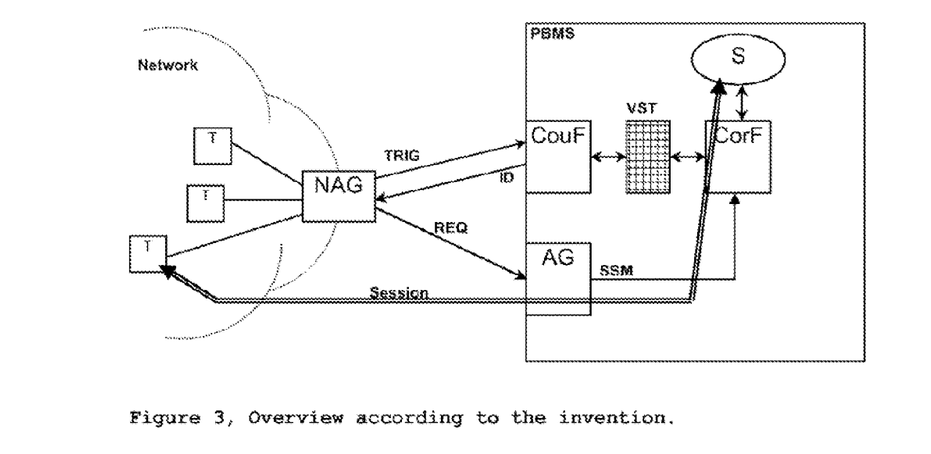
FIG. 3 shows a schematic representation of generic overlay system between a network and a packet based multimedia system according to the invention.

FIG. 3 provides an overview of a generic overlay system according to the invention. A service in the Packet Based Multi Media System is provided to a terminal (T) not having a subscription in the Packet Based Multi Media System in a session between terminal (T) and Service (S). The Packet Based Multi Media System comprises;

A Coupling Function (CouF), a Virtual Subscription Table (VST), a Correlation Function (CorF), a special adapted Access Gateway (AG) and at least one Service (S) that can be provided to terminals in the Network.

The Coupling Function (CouF) has a connection with the Network via the Network Access Gateway (NAG). The Coupling Function is especially adapted for the Network Interface Protocol applicable for communicating with the Network Access Gateway. As the Packet Based Multi Media System may be connected to several networks having different Network Interface Protocols, the Coupling Function has specific interface handlers for each Network Interface Protocol. Alternatively the Packet Based Multi Media System has multiple Coupling Functions each having a specific interface handler for a specific Network Interface Protocol. Instead of multiple interface handlers the Packet Based Multi Media System may contain also multiple protocol converters connected with a single internal protocol to the Coupling Function. The Packet Based Multi Media System may also contain multiple Coupling Functions for providing faster handling of requests for service from Terminals or being geographically in the vicinity of the Network Access Gateways. The Coupling Function is further connected to a Virtual Subscription Table (VST).

The Virtual Subscription Table (VST) holds several entries each uniquely identified through a Virtual Subscription Identifier. Each entry allows the storage of a terminal identifier to show coupling between a terminal and a virtual subscription. With no terminal identifier present the virtual subscription is said to be free. Alternatively a special free/occupied flag may be added to the entry. Each entry further has storage location for parameters belonging to the terminal and which are relevant for the Service to be provided. Instead of one single table the Virtual Subscription Table (VST) may have groups of Virtual Subscriptions. Groups may be defined on basis of Network Interface Protocol applicable having a one to one relation with multiple Coupling Functions, location based as being geographically close to Network access gateways, based on available services in the Packet Based Multimedia System as one to one relation with the services, or a combination of these.

The Access Gateway (AG) is as the Coupling Function (CouF) connected to one or more Network Access Gateways (NAG) in one or more Networks.

Again the Network Interface Protocol can be different per Network Access Gateway. The Access Gateway therefore requires multiple interface handlers internally, or multiple Access Gateways are provided having dedicated interface handlers. The Packet Based Multi Media System may contain also multiple protocol converters connected with a single internal protocol to the Access Gateway. In the latter case protocol converters can be shared with the Coupling Function. The Access gateway is especially adapted as it contains a list of Virtual Subscriptions valid in the Packet Based Multi Media System, enabling the Access Gateway to recognize session requests received from terminals that are virtually subscribed. The Access Gateway is inside the Packet Based Multi Media System connected to the Correlation Function (CorF).

The Correlation Function (CorF) is connected to the Virtual Subscription Table (VST) and to one or more services (S). The Correlation Function retrieves the Virtual Subscription Identity in the request from the Access Gateway (AG), retrieves with that the terminal identity and required parameters from the virtual Subscription Table, and passes them to idle requested service. After that the virtual subscription is set to free so it can be used for coupling another terminal identity.

With the terminal identity and received parameters, and an established session between terminal, and Service, the Service can now serve the terminal with its request.

Figure 4:
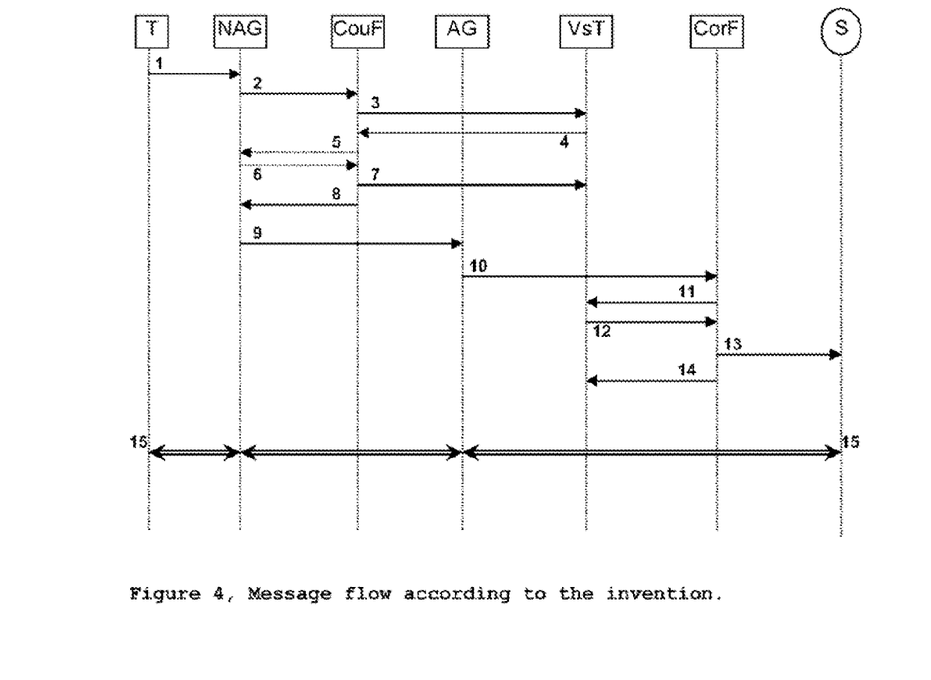
FIG. 4 shows a message flow diagram in a generic overlay system between a network and a packet based multimedia system according to the invention.

The sequence of events for establishing the session between service and terminal is given in FIG. 4. The sequence starts with the requesting (1) of a service (S) by a terminal (T). The Network Access Gateway (NAG) recognizes the service request as a request for a service from the Packet Based Multimedia system, e.g. by virtue of having an IMS service indicator for this subscriber, and forwards this service request as a service request message (2) to the Coupling Function (CouF). The service request message comprises as a minimum an identity of the terminal (T) and can be extended with relevant parameters for the service (S). On receipt of the service request message the Coupling Function (CouF) addresses (3) the virtual Subscription Table (VST) to return (4) an identity of a free Virtual Subscription in the table or optionally in a specific group in the table. The Coupling Function (CouF) checks whether all relevant parameters for the service are provided by the Network Access Gateway (NAG). This can be the case when a Network Interface Protocol does not allow all parameters in one message or when a service request may be started before the subscriber has provided all information to the NAG. When relevant parameters for deploying the service (S) are missing the Coupling Function (CouF) addresses (5) the Network Access Gateway (NAG) for the remaining parameters. The Network Access Gateway (NAG) sends (6) for remaining parameters. Steps 5 and 6 can be repeated to obtain all parameters. The Network Access Gateway (NAG) may interrogate the terminal (T) or other entities in the network for obtaining the parameters. This optional activity is not shown in the diagram. Having all relevant parameters, the Coupling Function (CouF) stores (7) the terminal identify and all relevant parameters in the free Virtual Subscription as indicated by the identity of a free virtual Subscription received in (4). As a final action the Coupling function (CouF) sends a message (8) to the Network Access Gateway (NAG) comprising the identity of the free Virtual Subscription and an address of an Access Gateway (AG) that shall be used for setting up a session with the requested service.

The Network Access Gateway (NAG) initiates a session with the requested service (S) by sending a session start request (9) to the Access Gateway (AG). The session start request contains as a minimum the identity of the free Virtual Subscription. The Access Gateway (AG) recognizes from the identity of the free Virtual Subscription in the session start request that it is an overlay case and not a regular session request from a registered user of the Packet Based Multimedia System. The Access Gateway (AG) forwards (10) therefore the session start request as a session start message to the Correlation Function (CorF). The session start message contains as a minimum the identity of the free Virtual Subscription. The Correlation Function (CorF) uses the identity to address (11) the Virtual. Subscription Table (VST) for retrieving (12) terminal identity and relevant parameters, and passes (13) the received information to the requested service (S).

In order for the Correlation Function (CorF) to pass the received information to the requested service (3) and net to another service, several alternative implementations are discussed now.

Most preferred implementation is a Virtual Subscription Table (VST) that has groups of Virtual Subscriptions, one group for each service that can be rendered by the Packet Based Multimedia System. This has the advantage that the entry in the table has explicit storage for the relevant parameters. The Correlation Function recognizes from the group immediately which services to pass to. The Coupling Function decided when processing a service request from which group in the VST to obtain a free virtual subscription.

Alternative is that the entry in the table has an additional indicator or address of the requested service.

Both alternatives require that the Coupling Function is knowledgeable of services that can be rendered by the Packet Based Multimedia System.

A different alternative requires a less intelligent Coupling Function. In this alternative the Coupling Function does not distinguish between services. When requesting a service only a terminal identity and one parameter, typically being a string of characters, is required. The string of characters contains all relevant information on what type of service is requested and the information required by that service. The optional communication steps 5 and 6 are not required and the Virtual Subscription Table is more compact. It does however require a parsing mechanism after the Correlation Function retrieved the string from the Virtual Subscription Table. The parsing mechanism, inside the Correlation Function or provided as a separate function in the Packet Based Multimedia System, takes care that the correct service is rendered.

The parsing mechanism can also be applied in the first two alternatives simplifying the communication between Network Access Gateway and Coupling Function.

When the requested Service (S) has received terminal identity and parameter from the Correlation Function (CorF) the session (15) between terminal (T) and Service (S) is established for rendering the requested service to the terminal. The Correlation Function (CorF) now clears the entry (14) in the Virtual Subscription Table (VST) which sets the virtual Subscription to free so it can be used for setting up a next session.

The session (15) between Terminal (T) and Service (S) has typically 3 legs, one based on the internal protocol of the racket Based Multimedia System, a second part based on the Network Interface Protocol between Network Access Gateway (NAG) and Access gateway (AG), and a third part based on the network internal protocol between Network Access Gateway (NAG) and Terminal (T). Network Access Gateway and Access Gateway provide protocol conversion in the session.

An additional advantage is achieved by time-stamping entry into the Virtual Subscription Table (VST). When writing terminal identity and parameters in the table also a time-stamp is written in the table. The Correlation Function (CorF) has an additional task of continually scanning of non-free entries and comparing the time-stamp with the current system rime in the Packet. Based Multimedia System. It the difference exceeds a certain maximum, the entry is cleared and set to free. A typical value for the maximum time an entry may be occupied is found to be less than 5 minutes. This additional feature prohibits hanging of occupied Virtual Subscriptions as may occur when the terminal is switched-off between, the messages (8) and (9).

Hereafter a typical implementation is described where the network is a GSM Mobile phone network and the Packet Based Multimedia System, is an IMS. The entities relevant for this implementation are stated in FIG. 5.

Figure 5:
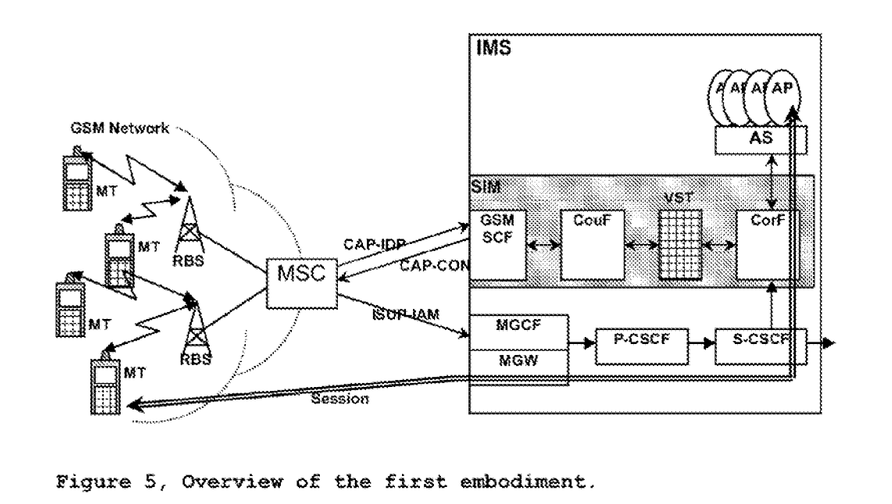
FIG. 5 shows a schematic representation of a preferred embodiment of an overlay system between a GSM network and an IMS network according to the invention.

The Terminal (MT) in this implementation is GSM compliant having a radio interface towards a Radio Base Station (RBS). The Radio Base Station has a fixed connection to an MSG that serves as the Network Access Gateway. FIG. 5 snows only one MSC but in practise the GSM network can nave a plurality of MSCs. All MSCs are connected to the Packet Based Multimedia System by means of two Network Interface Protocols; for connection to a Coupling Function the CAP, CAMEL Application Part is used, for the connection to the Access Gateway the ISUP, ISDN User Part is used. The interface handler for CAP is a GSM-Service Control Function (GSM-SCF). The interface handier for ISUP is integrated in the MGCF. The MGCF is mainly for setting up and controlling sessions. For a voice call or a video call the actual content of session i.e. audio, video, photo, HTML page, or database query rues via the MGW. One or more MGWs are connected to a MGCF or a MGW is integrated with the MGCF. As discussed in the prior art multiple MGCFs may exist in an IMS. The P-CSCF and S-CSCF are intermediate functions involved in the setting up of the session but do not have a specific function related to the invention other than relaying messages between MGCF and Correlation Function. The session inside the IMS is a SIP session as defined in the prior art description.

By its nature line Service Interaction Manager (SIM) has in this implementation the Coupling Function, Correlation function and the Virtual Subscription Table integrated. These entities can however also be separate functions in the IMS. The services in the IMS are provided by applications (AP) running on an Application Server (AS).

Figure 7:
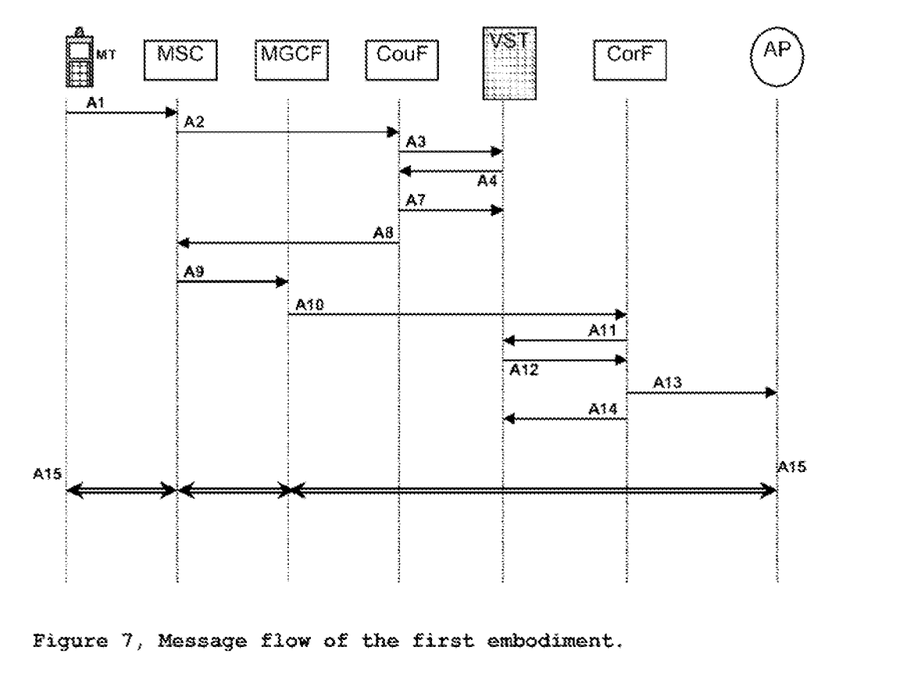
FIG. 7 shows a message flow diagram is a preferred embodiment of an overlay system between a GSM network and an IMS network according to the invention.

The flow of information is shown in FIG. 7 and will be used for a detailed view of the steps and functions involved in setting up a SIP session in the IMS.

A GSM terminal requests a service; this request will reach the MSC. Based on the special parameter in the HLR, see prior art description, the MSC forwards a service request to the IMS using CAP. Service requests if rows GSM are rather straight forward as containing the identifier of the terminal and a string of characters identifying the service and relevant additional information for the service. Parsing of the string determines the service to render. This parsing is done in the SIM and AP.

In order to illustrate setting up a SIP session a simple example is used where the GSM terminal, with ID—+6 516 13 111, calls (A1) another party by means of a short private number, here "2400". The short number relates in this example to a SIP terminal.

The fact that a called party number is a short number is detected by the MSC. As a result of the IMS parameter in the HLP, i.e. the O-CSI, the MSC sends a service request message (A2) to the Coupling Function (CouF) in the IMS. As CAP is used as protocol the message is a CAP ID, CAP Initial DP, message containing a Calling Party Number—+6 516 13 111 and a Called Party Number—"2400". This CA message is received by the Coup line Function is the Service Interaction Manager. Based on this service request, the Coupling Function addresses (A3) the Virtual Subscription Table which replies (A4) with an Identity of a free Virtual Subscription. The Coupling Function stores (A7) Calling Patty Number and a string of characters—"2400" in the Virtual Subscription as indicated by the Identity of the free Virtual Subscription. The Coupling Function replies to the CAP ID message with a CAP CON, CAP Connect, message (A8) having a called, party number that comprises a cc, Country Code of the IMS, a ndc, national destination code of the IMS network, a mqef-id, address of a MGCP to contact inside the IMS, and a psi, public service identity being too identity of a Virtual Subscription.

With the coupling process completed the GSM terminal is now registered in the IMS and a session can be set up for the GSM terminal.

The MSC therefore sends an ISUP IAM (A3) to the MGCF whose address was contained in the called party number in the CAP CON message received from the Coupling Function.

Alternatively the MSC may select the MGCF to send the ISUP-IAM (A9) to. The ISP IAM, ISUP initial address message, contains a called party number as received in the CAP CON message and the calling party number as previously sent in the CAP IDP message. The MGCF addressed receives the ISUP IAM. As the MGCF has a list of Virtual Subscriptions used in the IMS, the MGCF can distinguish that this request belongs to a virtual subscription rather than a surrogate or standard subscription. Further handling of the received message is therefore different to that for the other types of subscriptions.

The list of virtual subscriptions in the MGCF is either statically provisioned by the IMS operator or a special function in the network operation software takes care that virtual subscriptions in the VST are aligned with the list of virtual subscriptions in the MGCFs.

As the internal protocol in the IMS is SIP, the MGCF need to translate the ISUP IAM into a SIP Invite message. The SIP Invite message comprises P-asserted-id—psi@"operator", where "operator" is for example 9TEL.US, and RU, request URI,—psi. This can be seen as basically trying to set up a session to your self. As the MGCF has recognized the virtual subscription it emulates a UNI, user to network interface, SIP Invite message by directly sending (A10) the SIP Invite message to a P-CSCF. As there may be more than one P-CSCF in the IMS network the MGCF has a few options to obtain the right P-CSCF address.

Most simple is a fixed address. All UNI SIP Invite messages for Virtual subscriptions are forwarded to the same P-CSCF. Alternative can be that in the list of virtual subscriptions each virtual subscription has also an address for a P-CSCF attached. Also more complex schemes might be appropriate taking into account the actual load of P-CSCFs. The P-CSCF forwards the SIP Invite message as received to an S-CSCF in the IMS network.

The S-CSCF forwards the SIP Invite message further to the Correlation Function (CorF) in the Service Interaction Manager (SIM).

When received, the Correlation Function (CorF) interrogates (A11) the Virtual Subscription Table (VST) for an entry identical to RU in the SIP Invite message. The reply (A12) contains the original calling party ID of the GSM terminal and the character string as previously stored by the Coupling Function (CouF).

The Correlation Function (CorF) alters the SIP Invite message by entering the calling party number of the GSM terminal into P-asserted-id and the character string into the RU. The altered SIP Invite message is forwarded (A13) to the defined Application Server (AS).

With this step the Session (15) between Terminal (T) and Application (AP) is set up. As in this case it was a short number related to a SIP terminal, the Application (AP) invites the SIP terminal and a voice session is started between both terminals where the IMS internal leg is IP based, the MGW translating IP into PCM, and PCM based leg between MGW and MSC.

Now that the session is initiated, the Correlation Function (CorF) clears the entity (A14) in the Virtual Subscription Table (VST). Without a terminal identifier associated with it the entry is free.

Figure 6:
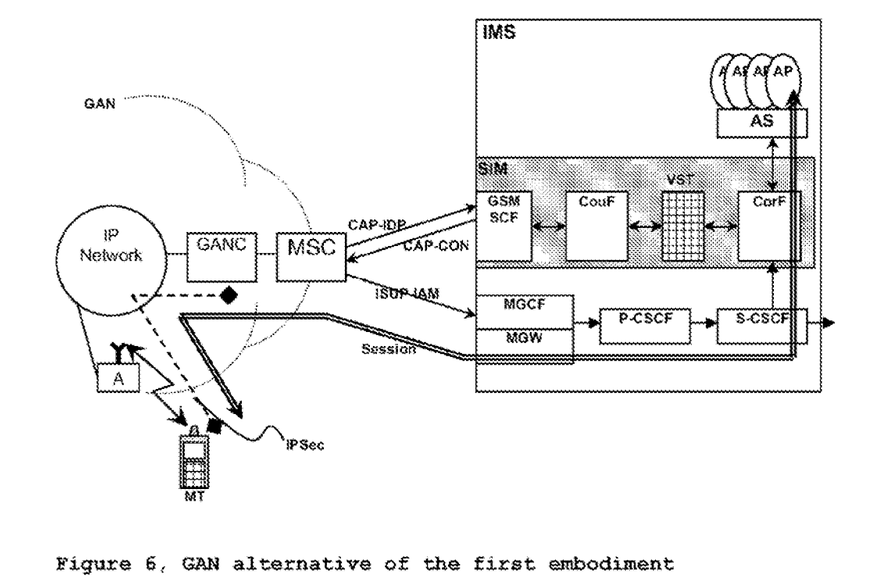
FIG. 6 shows an alternative of FIG. 5 in the case of terminals having GAN, Generic Access Network, connection.

FIG. 6 gives an overview of General Access Network (GAN). GAN terminals can besides the radio connection in a GSM or UMTS network also have local connections to an access point (AP) by means of infra red, Bluetooth, WIFI or WLAN. When a mobile terminal (MT) moves into or is switched on in the coverage area of the access point the terminal is registered in a GAN controller (GANC). The GANC establishes a secure tunnel to the mobile terminal (MT) through an interconnecting IP network, IPSec tunnel. The GANC informs the MSC that the mobile terminal is now reachable via the GAN. The mobile terminal connected in the GAN has all the facilities it has in the GSM or UMTS network now provided through the GAN. This includes the rendering of services by an overlaying IMS.

As the interface to the IMS runs via the MSC, setting up a session is identical to what is described before for FIG. 7.

Figure 8:
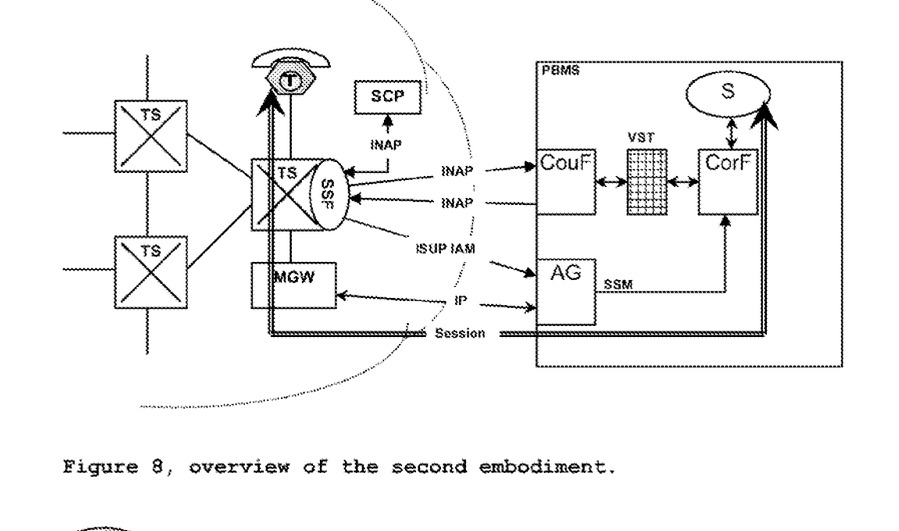
FIG. 8 shows a schematic representation of a preferred embodiment of an overlay system for a PSTN according to the invention.
Figure 9:
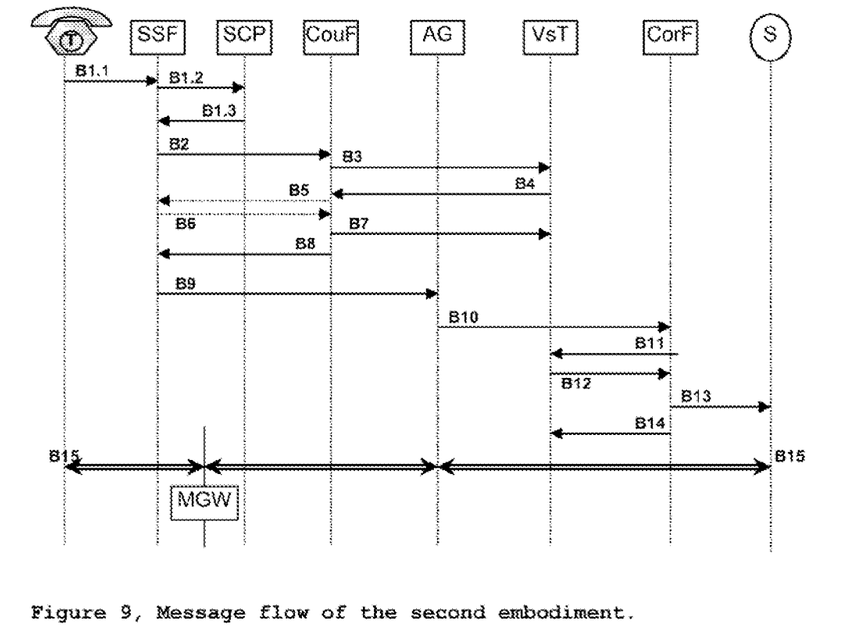
FIG. 9 shows a message flow diagram for the overlay system for a PSTN according to the invention.

A second embodiment is shown in FIGS. 8 & 9. Here the network is a public switched telephony network (PSTN) where telephony switches (TS) create a circuit through the network for a calling terminal (T) like a fixed line telephone. Also in the PSTN a system for rendering services is known. Therefore telephony switches (TS) can have a service signalling function (SSF) that recognizes the invocation of a service or facility. It forwards the invocation to a service control point (SC) that provides the service. The SSF communicates with the SCP via the intelligent network application protocol (INAP).

An operator deploying both a PSTN and a PBMS will be reluctant to have a service implemented in two systems. They can therefore instruct the SCP for certain services to provide the address of an alternative SCP that will provide the service. In this case it will be the PBMS that acts towards the SSF as an alternative SCP.

An invocation of a service (B1.1) is recognised by the SSF. The SSF contacts its standard SCP with an INAP inquiry Message (B1.2). The SCP replies for this specific service with an INAP CON, INAP connect, message (B1.3) informing the SSF to contact another SCP responsible for rendering the Service. The SSF contacts (B2) the CouF in the PBMS with an INAP inquiry message rise (B1.2) now having the address of the CouF as obtained from the SCP.

Based on this service request the Coupling Function addresses (B3) the virtual Subscription Table which replies (B4) with an Identity of a free Virtual Subscription. Optionally, the CouF can interrogate the SSF for additional parameters (B5 and B6) that were not provided in the initial request. CouF stores (B7) the parameters required for the service in the Virtual Subscription as indicated by the identity of the free Virtual Subscription. The Coupling Function replies to the SSF with an INAP CON message (B8) having a called party number that comprises an address of an access gateway (AG) of the PBMS to contact and a psi, the identity of a Virtual Subscription. With the coupling process completed the terminal is now registered in the IMS and a session can be set up for the terminal.

The SSF initiates a session with the requested service (S) by sending an ISUP IAM (B9) to the Access Gateway (AG). The ISUP IAM contains the identity of the free Virtual Subscription the Called Party Number field. The Access Gateway (AG) recognizes from the identity of the free Virtual Subscription that it is an overlay case and not a regular session request from a standard or surrogate registered user of the Packet Based Multimedia System. The Access Gateway (AG) forwards (B10) therefore the ISUP IAM as a session start message (SSM) to the Correlation Function (CorF). The session start message contains the identity of the free Virtual Subscription. The Correlation Function (CorF) uses the identity to address (11) the Virtual Subscription Table (VST) for retrieving (12) terminal identify and relevant parameters, and passes (13) the received information to the requested service (5). The resulting session (B15) between Terminal (T) and Service (S), being the path for the media, has typically 3 legs, one based on the internal protocol of the Packet Based Multimedia System, a second part based on IP between a media gateway (MGW) in the PSTN and the access gateway (AG), and a third part based on TDM through the telephony switches (TS) to Terminal (T). The signalling path and the media access may be combined in the AG but may also be split into an AG for signalling only and a MGW for the media. The MGW in the PSTN and the MGW in the PBMS may also be integrated into one, shared by PSTN and PBMS.

Figure 10:
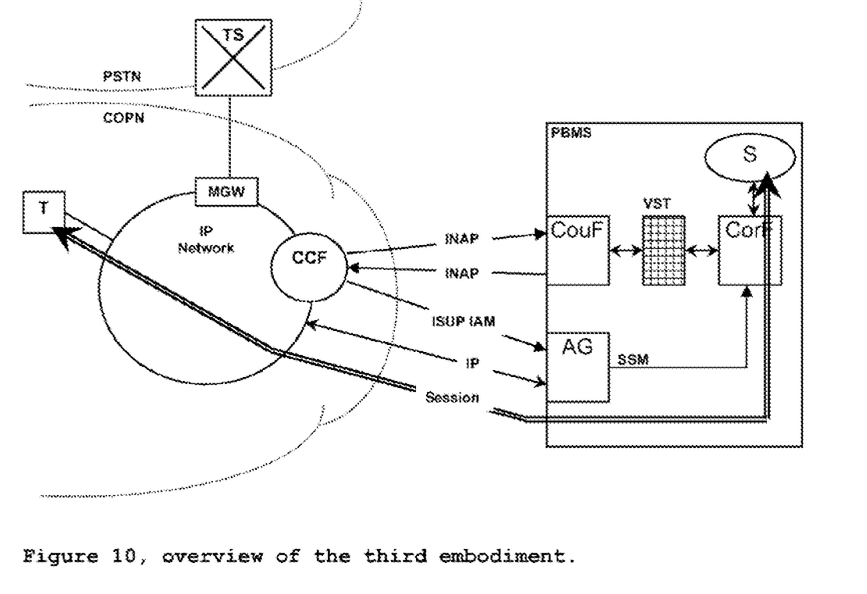
FIG. 10 shows a schematic representation of a preferred embodiment of an overlay system for COPN according to the invention.
Figure 11:
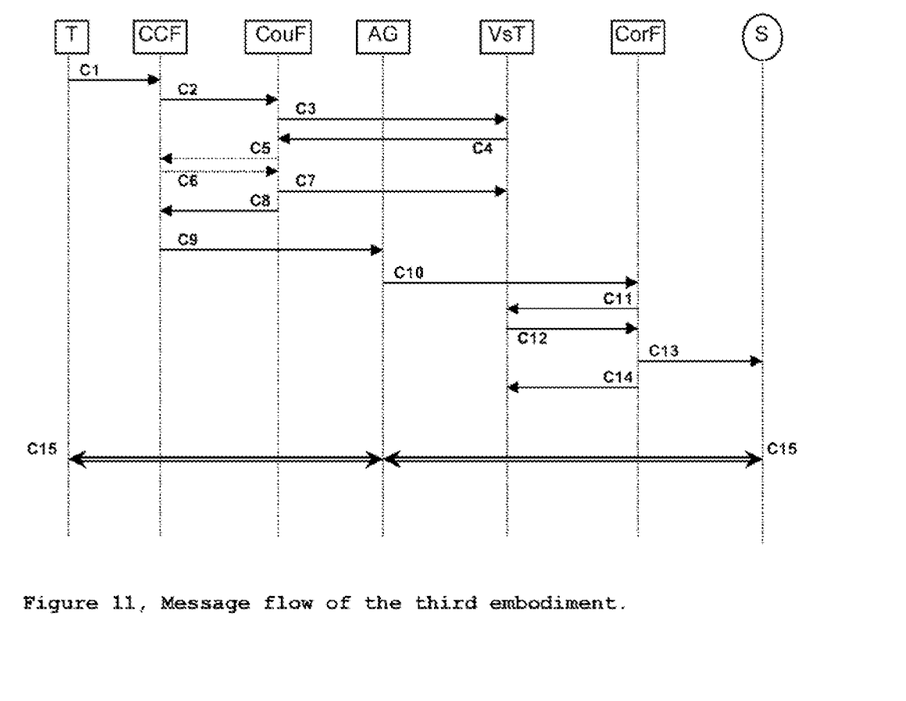
FIG. 11 shows a message flow diagram for an overlay system for COPN according to the invention, FIG. 12 snows a schematic representation of a preferred embodiment of an overlay system for a WAN according to the invention.

A third embodiment is shown FIGS. 10 and 11.

In the third embodiment the network is a voice over IP (VOIP) network where terminals have a fixed line telephone number so they can be called from a PSTN or from other networks. Example of such a network is a cable TV operator network (COPN).

Terminals have the possibility to be connected via the PSTN where a media gateway (MGW) translates IP packets to PCM and vice versa. Services can therefore be rendered in the way as described in the second embodiment. However when a call is fully in the IP domain, i.e. not running via a PSTN, service invocation would not be possible.

To make it possible that a terminal can call or can be called via the PSTN one COPN requires a call control function (CCF). The CCF acts as MSC or SSF using CAP or INAP protocol towards the PBMS. FIGS. 10 and 11 show the INAP case. The sequence of messages used to setup a session is identical to the first or second embodiment. Reference is made to these descriptions.

The established session (C15) has now typically two parts, an IP based part from the terminal to the AG in the PBMS and a PBMS internal part from AG to the service (S). Note that multiple elements like firewalls, secure funnelling etc. can be included in these parts.

Figure 12:
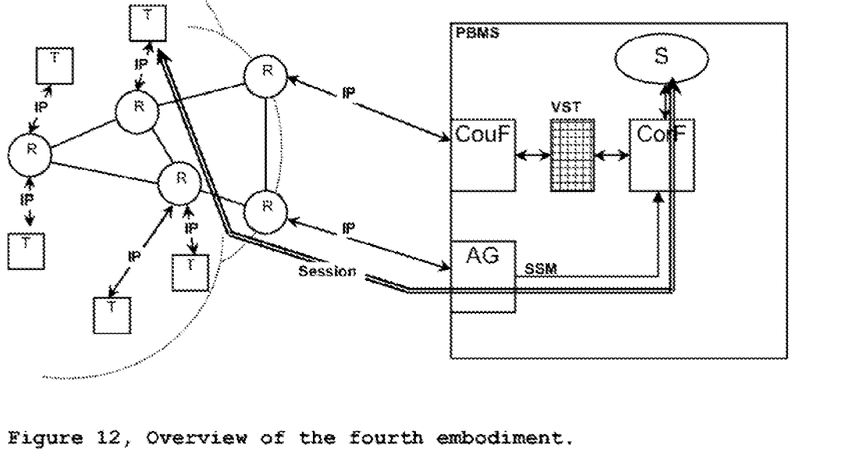
Figure 13:
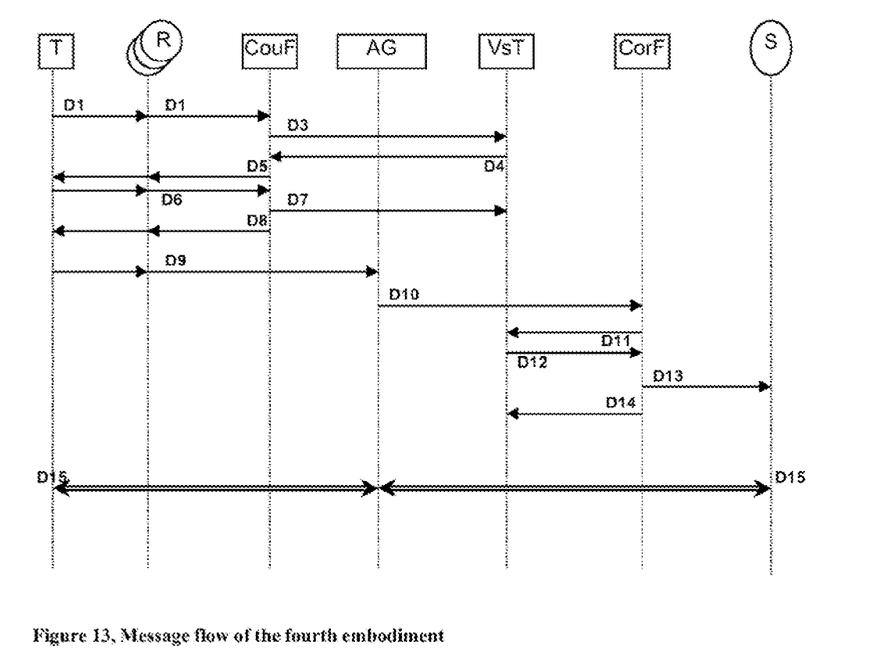
FIG. 13 shows a message flow diagram in a preferred embodiment of an overlay system for a WAN according to the invention.

A fourth embodiment is shown in FIGS. 12 and 13. With reference to FIG. 12 the network is here a Wide Area Network (WAN) where terminals (T) are connected to Routers (R) by means of the standard Internet Protocol (IP). One or more of these routers (R) function as Network Access Gateway (NAG) to a packet based multimedia system. The Network Interface Protocol between Network Access Gateway and packet, based multimedia system is also the standard Internet Protocol (IP). The interface handlers for the CouF and AG are especially adapted for handling the IP based interface.

Special adaptation is required for providing a security level Due to the open nature of an IP network. The interface handlers limit access to the PBMS to predefined data elements in predefined messages.

A user by means of his terminal (T) requires a service or facility from the PBMS in which he has no subscription. The service or facility is rendered by a PBMS Service (S). It is therefore required to set up a session between terminal (T) and service (S) that is secure. Steps in the procedure to establish the session are shown in FIG. 6.

The procedure starts with the terminal (T) obtaining the address and message format to be used. As preferred embodiment address and message format are included in a piece of software code that also arranges the security aspects. The software code can be resident in the terminal or embedded in other software resident in the terminal but can also be provided to the terminal like a JAVA applet via an internet page, attached to an E-mail or included in a file downloaded by the terminal. The software code takes care of steps required to set up the session.

The user activates the software code and the software code in the terminal will produce service request message (D1) and will send it to the Coupling Function (CouF). The service request message includes the identity of terminal (T). As the signalling protocol is now IP based an IP based identification of the terminal (T) is required.

In order to get a secure channel, some additional exchange of information between the software code in the terminal (T) and the IP Interface Handler will take place. This exchange of information is not shown in FIG. 8 because it largely depends on the security protocol chosen and because it is not important for the core of the invention.

After receiving the service request message the Coupling Function (CouF) requests (D3) a free Virtual Subscription from the Table of Virtual Subscriptions (VST). The request includes the terminal identity that is stored with the free Virtual Subscription to indicate that it is occupied. The free Virtual Subscription Identifier is returned (D4) to the Coupling Function (CouF).

The Coupling Function (CouF) sends a message (D5) back to the software code in the terminal (T) for getting additional parameters. One specific parameter is required in this embodiment. Unlike the first embodiment there is now not a guaranteed Terminal Identity that can be charged for the services rendered. In the first embodiment the cost is charged to the account, either prepaid or post paid, related to the extension number of the GSM phone. In the second embodiment this was a fixed line account and in the third embodiment it was fixed line comparable account from the cable operator. For the fourth embodiment an account has to be provided by the user like a credit card number, telephone number, or bank account to charge the cost to. The software code in the terminal will prompt the user to provide the account number. The additional parameters are returned (D6) by the software code in the terminal (T) to the Coupling Function (CouF). The Coupling Function (CouF) before acting further checks the validity of the account number provided. If found to be invalid, the sequence is aborted, and a blank terminal identity is stored (D7), setting the Virtual Subscription to free again.

When found to be valid the additional parameters are stored D7) in the Table of Virtual Subscriptions.

In the case of a valid account the Coupling Function (CouF) sends a message to the software in the terminal (T) containing the Virtual Subscription Identifier and the identity of fine access gateway (AG) to be used for performing a session request.

The software in the terminal (T) sends a session request (D9) to the AG which includes the Virtual Subscription Identifier and the terminal identity. The AG translates the session start request into a session start message (SSM, D10). The further sequence (D10 to D15) is comparable to what is described in the earlier embodiment.

The AG in one 4th embodiment has the main function to act as firewall and allow only secure channels into the PBMS.

The invention claimed is:

1. A Service Interaction Manager in a packet based multimedia system, the Service Interaction Manager being connected to a Network Access Gateway of a network in communication with the packet based multimedia system, wherein a terminal connected in the network requests a service in the packet based multimedia system, but the terminal does not have a subscription in the packet based multimedia system, the Service Interaction Manager comprising:
 a Table of Virtual Subscriptions for storing temporary virtual subscriptions;
 a Coupling Function connected with the Network Access Gateway and the Table of Virtual Subscriptions, wherein the Coupling Function is configured to utilize the Table of Virtual Subscriptions to couple an available virtual subscription to a terminal identifier of the terminal and store in the Table of Virtual Subscriptions, a temporary association between the terminal identifier and the available virtual subscription; and
 a Correlation Function connected with the requested service, the Table of Virtual Subscriptions, and a packet based multimedia system access gateway, wherein the Correlation Function is configured to:
 receive a session start request message from the packet based multimedia system access gateway, the session start request message including the terminal identifier; and
 utilize the Table of Virtual Subscriptions to correlate the session start request message with the available virtual subscription based on the terminal identifier received in the session start request message.

2. The Service Interaction Manager according to claim 1, further comprising an Interface Handler configured to control use of a Network Interface Protocol towards the Network Access Gateway.

3. The Service Interaction Manager according to claim 1, wherein the Table of Virtual Subscriptions stores groups of Virtual Subscriptions.

4. The Service Interaction Manager according to claim 1, wherein the Table of Virtual Subscriptions includes a storage location for a terminal identifier for each Virtual Subscription.

5. The Service Interaction Manager according to claim 1, wherein the Table of Virtual Subscriptions includes a storage location for a tag indicating whether each Virtual Subscription is available or coupled.

6. The Service Interaction Manager according to claim 1, wherein the Table of Virtual Subscriptions includes a storage location for a time-stamp for each Virtual Subscription.

7. The Service Interaction Manager according to claim 1, wherein the Table of Virtual Subscriptions includes a storage location for an account number for each Virtual Subscription.

8. The Service Interaction Manager according to claim 1, wherein when the session is initiated, the correlation function is configured to:
- decouple the terminal identifier from the virtual subscription; and
- clear the temporary association between the terminal identifier and the virtual subscription, thereby setting the virtual subscription to available.

9. The Service Interaction Manager according to claim 6, wherein when a maximum time a coupling may exist is exceeded, the correlation function is configured to:
- decouple the terminal identifier from the virtual subscription; and
- clear the temporary association between the terminal identifier and the virtual subscription, thereby setting the virtual subscription to available.

* * * * *